United States Patent [19]
Smith

[11] Patent Number: 5,819,630
[45] Date of Patent: Oct. 13, 1998

[54] BANDSAW

[75] Inventor: Ted Smith, Reaboro, Canada

[73] Assignee: T.S. Manufacturing Company, Lindsay, Canada

[21] Appl. No.: 647,283

[22] Filed: May 9, 1996

[51] Int. Cl.⁶ ........................................ B26D 1/46
[52] U.S. Cl. .................. 83/811; 83/812; 83/819; 83/74
[58] Field of Search .............. 83/801, 811, 812, 83/814, 817, 818, 819, 820, 794, 72, 74, 76.1, 76.7

[56] References Cited

U.S. PATENT DOCUMENTS

| | | | |
|---|---|---|---|
| 2,395,237 | 2/1946 | Swenson . | |
| 2,783,801 | 3/1957 | Mix | 83/820 |
| 3,905,266 | 9/1975 | Weavell et al. | 83/819 |
| 3,946,634 | 3/1976 | Allen et al. | 83/818 |
| 4,117,756 | 10/1978 | Harris | 83/801 |
| 4,179,961 | 12/1979 | Harris | 83/801 |
| 4,329,901 | 5/1982 | Stroud | 83/819 |
| 4,503,743 | 3/1985 | Ryba | 83/801 |
| 4,505,176 | 3/1985 | Hamel | 83/819 |
| 4,519,283 | 5/1985 | Sanborn | 83/801 |
| 4,546,682 | 10/1985 | Howard | 83/801 |
| 4,597,132 | 7/1986 | Elmer et al. | 83/814 |
| 4,763,637 | 8/1988 | Mayer | 83/814 |
| 4,866,630 | 9/1989 | Beaman et al. | 83/789 |
| 5,203,247 | 4/1993 | D'Arcy | 83/794 |
| 5,237,897 | 8/1993 | Wijesinghe | 83/72 |
| 5,341,712 | 8/1994 | D'Arcy | 83/808 |

FOREIGN PATENT DOCUMENTS

| | | |
|---|---|---|
| 994215 | 8/1976 | Canada . |
| 1322933 | 10/1993 | Canada . |

*Primary Examiner*—Maurina T. Rachuba
*Attorney, Agent, or Firm*—Baker & Daniels

[57] ABSTRACT

An improved bandmill tilt and strain apparatus of the type in which there is a bandmill having a frame support, a driven wheel mounted on the frame support, tracks attached to the interior of the frame support, bearing assemblies received within the tracks, an idle wheel mounted on an arbor which is rotatably received in the bearing assemblies, wherein there is provided a first bearing assembly, a second bearing assembly, a tilt means located directly in one of the assemblies, a tilt control means associated with the tilt means, a common pivot shaft mounted on the support frame, a pair of tilt arms, each arm being pivotally connected at one end to the common pivot shaft, and at the other end bearing the weight of the first bearing assembly member or the second bearing assembly member, the tilt means being disposed between a selected one of the tilt arms and the selected bearing assembly, a strain producing arm rigidly connected to the common pivot shaft at one end, a strain means pivotally connected to the strain producing arm at one end and to the frame support at the other end, and a strain control means.

6 Claims, 2 Drawing Sheets

BANDSAW

BACKGROUND OF THE INVENTION

The present invention relates to an apparatus for generating bandsaw strain and tilt.

A basic bandsaw consists of two coplanar wheels around which an endless saw blade rotates. A cutting throat is formed between the wheels on the downward rotation of the saw blade and this area can process logs of a large diameter. Typically, one of the two wheels is rotated by a motor while the other rotates under force transmitted through the movement of the saw blade. This idle wheel may be oriented to provide improved bandsaw performance. The wheels used in bandsaws are typically crowned and blades have a complementary inner surface to keep the saw running on line.

A problem with bandmills is the tendency of the saw blade to slip out of position. This produces logs with uneven surfaces and may also damage the blade or bandmill. Precise positioning of the saw blade teeth relative to the wheel is also important to maintain adequate stiffness in the blade cutting surface. This enhances cutting quality and blade life. One cause of blade wander is a decrease in tension on the blade caused by blade expansion as a result of generated heat. Saw vibration in the cutting area may also cause the blade to slip. Maintaining a sharp cutting surface, altering the saw feed rate and using a thicker saw blade are minor adjustments which address this problem.

Another common approach in the industry is to separate the wheels to increase saw blade tension (saw strain). This is done by raising the idle wheel while keeping it in the same plane as the powered wheel. It is important to not to apply excess saw tension because it may stretch & wear the blade which decreases its working life. It can also result in increased maintenance costs and wear on the tension assembly.

Blade tracking may also be controlled somewhat by tilting one of the wheels (normally the idle wheel) slightly out of the longitudinal plane of the other wheel. The arbor of the idle wheel is, in one commercially viable design, mounted on two slidable carriages which can move relative to the casing of the bandmill. Tilting of the wheel is achieved by moving one carriage relative to the other.

In the prior art, many devices have been used in an attempt to keep saw tension within an optimal range and to permit precise control over tilting.

Early strain mechanisms used springs or deadweight levers to place the idle wheel under a tension which would yield at excess pressures. The results were unsatisfactory using springs because the characteristics of springs were too variable in response to temperature, condition and age.

Deadweight lever mechanisms have problems resulting from accentuated mechanical friction and inertia of the weights. Two of the major functional inadequacies of this type of system are slow response time and the production of excessive saw strain.

Canadian Patent 994,215 is an example of an air strain mechanism which applies force to the idle wheel by means of an air spring. The air spring uses a pressurized gas supply and rotates a carrier arm with respect to a yoke in order to increase blade tension. A problem with air springs is their continuous reliance on a piped gas source and the necessity to maintain a relatively consistent pressure.

Canadian Patent 1,322,933 and U.S. Pat. No. 5,237,897 disclose the use of electronic sensors in an automatic track and strain control system. This type of electronic apparatus is costly to purchase and can lead to significant repair and maintenance expenses. Sawdust contamination makes design of effective sensor-based electronic circuits very difficult.

U.S. Pat. No. 2,395,237 teaches the use of a hydraulic system to maintain tension on the saw blade. Hydraulically based systems have been used with some success for many years and the invention disclosed and claimed herein utilizes a modified and highly effective hydraulic system.

SUMMARY OF INVENTION

The present invention overcomes the problems of prior art devices by way of a simple arrangement of force members (preferably hydraulic cylinders) and levers to precisely control the tension and the angular orientation of the idle bandmill wheel. In addition, the disclosed invention is economical to produce and very reliable.

According to the present invention then, there is provided an improved bandmill tilt and strain apparatus of the type in which there is a bandmill having a frame support, a driven wheel mounted on the frame support, tracks attached to the interior of the frame support, bearing assemblies received within the tracks, an idle wheel mounted on an arbor which is rotatably received in the bearing assemblies, wherein there is provided a first bearing assembly, a second bearing assembly, a tilt means located directly in one of the assemblies, a tilt control means associated with the tilt means, a common pivot shaft mounted on the support frame, a pair of tilt arms, each arm being pivotally connected at one end to the common pivot shaft, and at the other end bearing the weight of the first bearing assembly member or the second bearing assembly member, the tilt means being disposed between a selected one of the tilt arms and the selected bearing assembly, a strain producing arm rigidly connected to the common pivot shaft at one end, a strain means pivotally connected to the strain producing arm at one end and to the frame support at the other end, and a strain control means.

The new and inventive aspect of this bandsaw design is the tilt and strain assembly which may be remotely controlled by a skilled operator. Tilt is generated by a tilt means, which in a preferred embodiment is a hydraulic cylinder. This cylinder is located directly in one of the bearing assemblies that support the arbor of the idle wheel. In this preferred embodiment, the tilt cylinder is located directly below the ball bearing casing at the end of the arbor. One end of the tilt cylinder is attached to the ball bearing casing surrounding the arbor while the other end is attached to the base of the bearing assembly. When the cylinder is actuated by the tilt control means, upward force is applied to the ball bearing casing and this forces one end of the arbor upward relative to the other end. By moving one end of the arbor upward, the idle wheel is tilted out of the longitudinal plane of the lower wheel. The tilt control means can also return the tilt means and the arbor to their original or any intermediate position which decreases the tilt of the wheel.

The apparatus generates saw strain through a strain means, which in a preferred embodiment is a hydraulic cylinder. The hydraulic cylinder is the force member which cranks a lever system that strains the saw blade. The lever system is pivotable about a shaft attached to the bandmill frame. One arm supports each of the bearing assemblies. The arms attach at their other end to a pivot shaft, forming a U-shape. The arms pivot with the shaft and support the bottom of the bearing assemblies. A strain producing arm is attached at one end to the shaft at a point between the two arms. At the other end, the strain producing arm is attached to the hydraulic cylinder. The hydraulic cylinder is anchored to the bandmill frame. When fluid enters the hydraulic cylinder, it forces the arms and the strain producing arm to pivot with the shaft each end of which will be received in a bearing in the frame. Upward force is transferred to the bearing assemblies and the arbor which separates the idle and driven wheels further. The strain control means also returns the strain means and the arbor to their original or any intermediate position to decrease the strain on the blade.

BRIEF DESCRIPTION OF THE DRAWINGS

In drawings that illustrate the present invention by way of example.

DETAILED DESCRIPTION OF THE DRAWINGS

Figure 1:
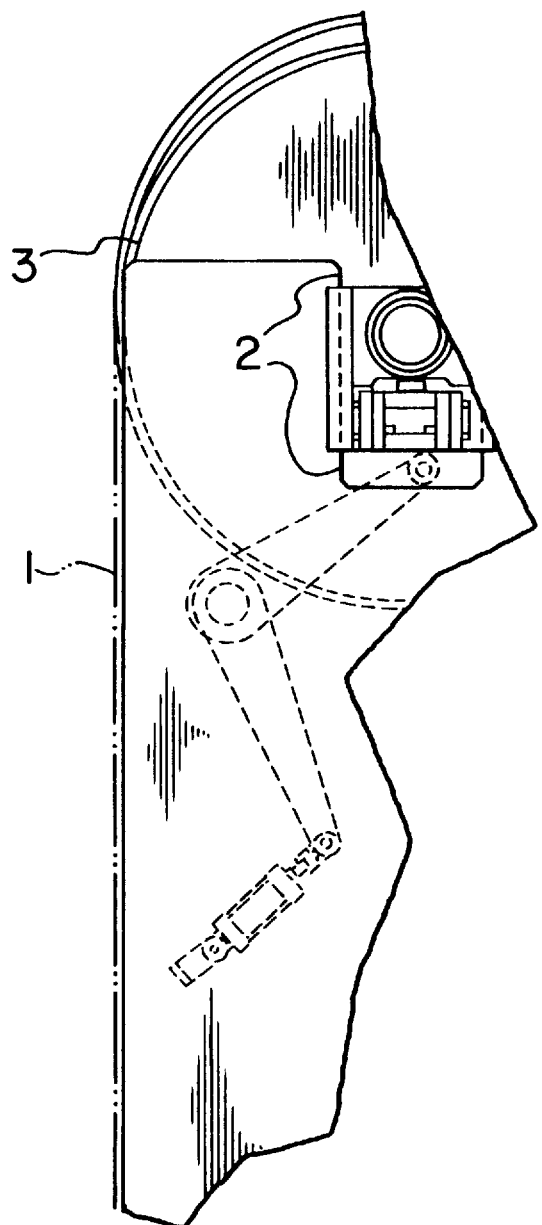
FIG. 1 is a side view, partially in phantom, of a bandsaw tilt and strain mechanism according to the present invention.

As illustrated in the figures, the bandsaw consists of an upper idle wheel 3 and a lower driven wheel (not illustrated) which are supported by the support frame 1. The frame 1 is shown in FIG. 1, broken away to expose the present invention. A saw blade loops around both of the wheels to provide a conventional cutting area.

An arbor passes through the driven wheel and is rotatably received in bearing assemblies within opposite sides of the support frame. The driving means for the bandsaw is well known in the prior art and may be a motor which turns the driving wheel, for example, by belts or a direct drive axle. The driving means, as well as the tilt control means (not illustrated) and the strain control means (not illustrated), described below, are intended to be controlled at a remote location by a skilled operator.

Figure 2:
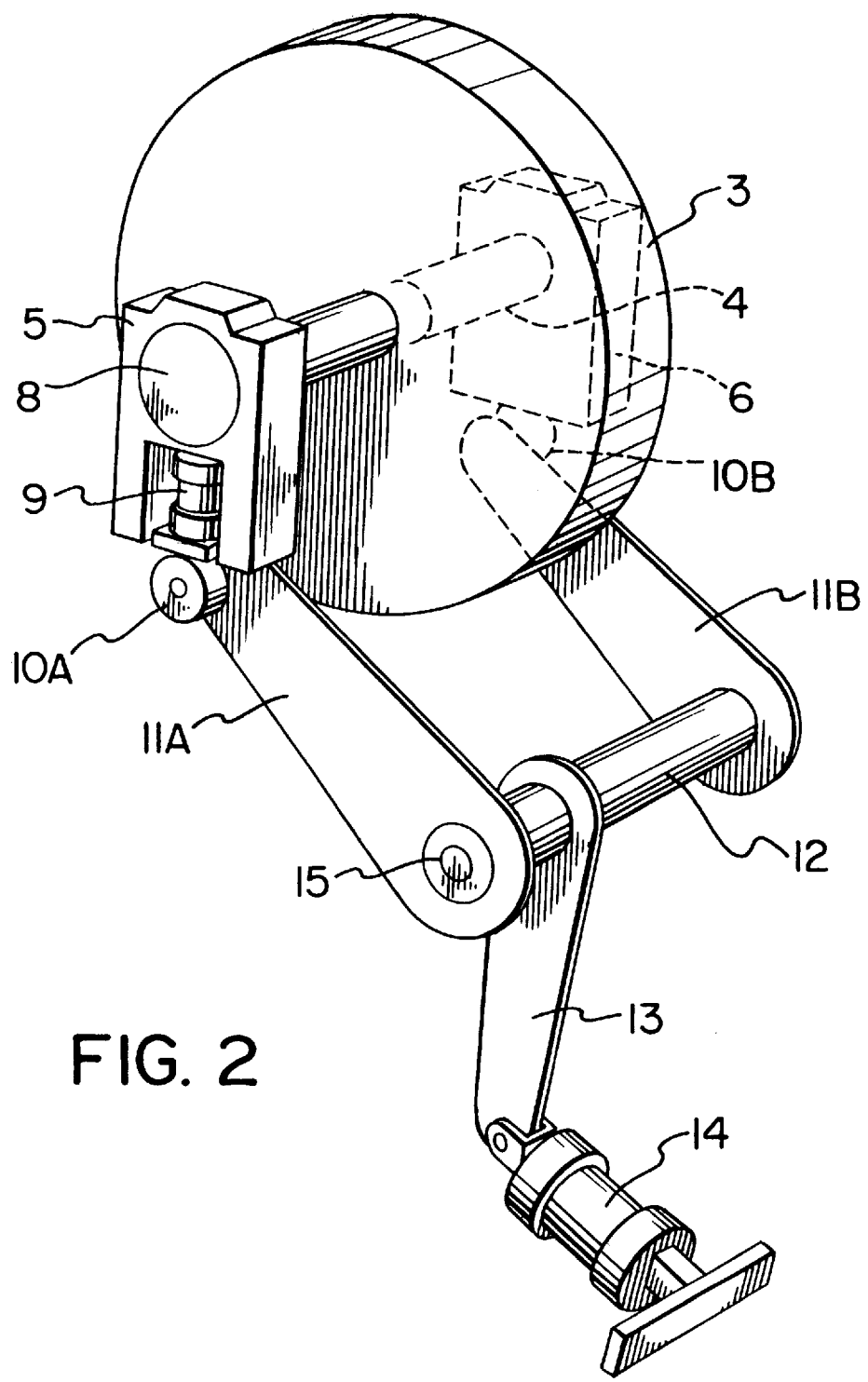
FIG. 2 is a perspective view of the tilt and strain mechanism only.

The idle wheel 3 is mounted on an arbor 4, as shown in FIG. 2. One end of the arbor 4 is received within a first bearing assembly 5 while the other end is received within a second bearing assembly 6. The arbor 4 can rotate freely in this position. The first bearing assembly 5 and the second bearing assembly 6 are mounted on tracks 2 in the frame and can slide along them. The ends of the arbor are mounted on ball bearings which are enclosed in a ball bearing casing 8. The first bearing assembly 5 contains a tilt means 9. A tilt control means actuates the tilt means 9. The tilt means applies upward force to the lower end of the ball bearing casing which forces one end of the arbor 4 to move upward relative to the other end of the arbor 4. As a result, the idle wheel 3 is tilted out of its initial orientation and is no longer in the same plane as the driven wheel. In a preferred embodiment, the tilt means 9 is a hydraulic cylinder and the tilt control means is a hydraulic fluid control circuit of a type well known in the prior art. Hydraulic pressure from the hydraulic fluid control circuit causes the hydraulic cylinder to force the bearing housing upward which tilts one end of the arbor.

The strain producing components of this apparatus are integrated with the tilt producing components. Bearing members 10A and 10B are secured to the ends of load bearing arms 11A and 11B of the strain mechanism. The bearing members support the weight of the bearing assemblies 5 and 6, and the idle wheel assembly. The arms 11A and 11B are rigidly connected to common pivot shaft 12 at the other ends. Arms 11A and 11B pivot with common pivot shaft 12 which is secured at each end thereof in a bearing 15 on the frame. A strain producing arm 13 is rigidly attached at one end to the common pivot shaft 12 at a point between arms 11. At its other end, strain producing arm 13 is rigidly attached to a strain producing means 14. The strain producing means 14 is anchored to support frame 1. A strain control means actuates the strain producing means 14 and causes it to apply force to strain producing arm 13. This forces arms 11A and 11B to pivot and apply upward force to the bottoms of first bearing assembly 5 and second bearing assembly 6, respectively. As the bearing assemblies 5 and 6 are forced upward, they move along tracks 2. The idle wheel 3 is now farther away from the driven wheel which increases the tension on the saw blade. Tension on the blade may be lowered by decreasing the force applied by the strain means 14 to the strain producing arm 13 which brings the idle wheel 3 and the driven wheel 15 closer together.

In a preferred embodiment, the strain means 14 is a hydraulic cylinder and the strain control means is a hydraulic fluid circuit of a type well known in the prior art.

It is obvious to one skilled in the art that certain deviations from this description of the invention and its preferred embodiments are possible without deviating from the scope of invention as defined in the claims and figures.

What is claimed is:

1. An improved bandmill tilt and strain apparatus comprising:

a support frame;

a saw blade;

a driven wheel mounted on said support frame;

an idle wheel mounted on said support frame and cooperating with said driven wheel to operatively support said saw blade;

a plurality of tracks secured to said support frame;

first and second bearing assemblies operably associated with said plurality of tracks, said bearing assemblies including bearing housings;

a plurality of ball bearing casings mounted in said bearing housings;

an arbor rotatably received in said plurality of bearing casings and supporting said idle wheel;

a rotatable pivot shaft mounted in said support frame;

a plurality of moveable load bearing arms, each said load bearing arm rigidly connected at one end to said pivot shaft and rotatable therewith in unison, the other ends of said load bearing arms each operably associated with one of said bearing housings and supporting the weight of one of said first bearing assembly and said second bearing assembly;

a tilt means disposed between the other end of a selected one of said load bearing arms and its associated bearing assembly;

a single only strain producing arm having one end rigidly connected to the pivot shaft; and a single only strain producing means pivotally connected between the other end of the strain producing arm and the frame support, whereby operation of said strain producing means causes said plurality of load bearing arms to move in unison and to adjust the tension in said saw blade, and the operation of said tilt means causes adjustment of said associated bearing assembly and tilting of said idle wheel.

2. A bandmill tilt and strain apparatus as recited in claim 1, in which the tilt means comprises a hydraulic cylinder.

3. A bandmill tilt and strain apparatus as recited in claim 2 in which the strain means comprises a hydraulic cylinder.

4. An apparatus as claimed in claim 3, wherein said tilt control means, and said strain control means, are hydraulic control circuits, operably connected to a remote location at which one operator may control said bandmill.

5. An apparatus as claimed in claim 1, wherein said load bearing arms each include a bearing member at their other ends.

6. An apparatus as claimed in claim 1, wherein said pivot shaft extends from side to side across said support frame and is pivotally connected at each end to said frame.

* * * * *